(12) United States Patent
Papanikolaou et al.

(10) Patent No.: US 9,659,143 B2
(45) Date of Patent: May 23, 2017

(54) METHOD FOR ANALYZING THE ROBUSTNESS OF COMPONENTS WITHIN A VEHICULAR MECHANICAL SYSTEM TO CALCULATE OUT-OF-SPECIFICATION ROBUSTNESS

(71) Applicant: Ford Global Technologies, LLC, Dearborn, MI (US)

(72) Inventors: Kosta Papanikolaou, Huntington Woods, MI (US); David Manuel Rogers, Southfield, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 658 days.

(21) Appl. No.: 14/173,216

(22) Filed: Feb. 5, 2014

(65) Prior Publication Data

US 2015/0217820 A1    Aug. 6, 2015

(51) Int. Cl.
G06F 17/50        (2006.01)

(52) U.S. Cl.
CPC ...... *G06F 17/5095* (2013.01); *G06F 17/5009* (2013.01); *G06F 2217/10* (2013.01)

(58) Field of Classification Search
USPC .................................. 703/8, 2, 22; 705/7.15
See application file for complete search history.

(56) References Cited

U.S. PATENT DOCUMENTS

| | | | |
|---|---|---|---|
| 6,366,822 B1 | 4/2002 | Heavlin | |
| 6,826,510 B2 | 11/2004 | Gong et al. | |
| 7,024,263 B2 | 4/2006 | Drake, Jr. et al. | |
| 7,477,262 B2 | 1/2009 | Tornquist et al. | |
| 7,660,697 B2 | 2/2010 | Hamazoe | |
| 8,265,100 B2 * | 9/2012 | Steiner | H04L 7/10 370/503 |

(Continued)

FOREIGN PATENT DOCUMENTS

JP    2008129727    6/2008

OTHER PUBLICATIONS

Shih et al., "Optimal Mechanical Design with Robust Performance by Fuzzy Formulation Strategy," Tamkang Journal of Science and Engineering, vol. 4, No. 1, pp. 71-79 (2001).

*Primary Examiner* — Thai Phan
(74) *Attorney, Agent, or Firm* — Jason C. Rogers; Price Heneveld LLP

(57) ABSTRACT

A method for increasing the robustness of a mechanism for a vehicle including the steps of determining a primary function of the mechanism, identifying components of the mechanism used during the primary function, analyzing each component under in-specification conditions, analyzing each component under decreasing out-of-specification conditions during performance of the primary function to determine a lower failure value for each component, analyzing each component during performance of the primary function under increasing out-of-specification conditions to determine an upper failure value for each component, determining a modified robustness value for each component, wherein the modified robustness value is between the lower and upper failure values and modifying each component in the vehicular mechanism to have a robustness that is approximately the modified robustness value of the respective component.

20 Claims, 13 Drawing Sheets

(56) References Cited

U.S. PATENT DOCUMENTS

| | | | | |
|---|---|---|---|---|
| 8,917,628 B2* | 12/2014 | Steiner | ................ | H04L 7/10 |
| | | | | 370/254 |
| 2009/0164177 A1 | 6/2009 | Hamazoe | | |
| 2012/0253874 A1* | 10/2012 | Harsh | ............ | G06Q 10/06395 |
| | | | | 705/7.15 |
| 2012/0253875 A1* | 10/2012 | Harsh | ............ | G06Q 10/06395 |
| | | | | 705/7.15 |
| 2015/0310149 A1* | 10/2015 | Dunnihoo | ......... | G06F 17/5018 |
| | | | | 703/2 |

* cited by examiner

| | Link A | Link B | Link C | Base | Out-of-Spec by: |
|---|---|---|---|---|---|
| Original Design | 58 | 70 | 90 | 100 | - |
| Upper Failure Value Link A | 70 | 70 | 90 | 100 | 1 |
| Lower Failure Value Link A | 0 | 70 | 90 | 100 | 57 |
| Upper Failure Value Link B | 58 | 132 | 90 | 100 | 61 |
| Lower Failure Value Link B | 58 | 68 | 90 | 100 | 1 |
| Upper Failure Value Link C | 58 | 70 | 112 | 100 | 21 |
| Lower Failure Value Link C | 58 | 70 | 88 | 100 | 1 |

| | Link A | Link B | Link C | Base | Out-of-Spec by: |
|---|---|---|---|---|---|
| Original Design | 58 | 70 | 90 | 100 | - |
| Balanced Design | 35 | 70 | 70 | 70 | - |
| Upper Failure Value Link A | 70 | 70 | 70 | 70 | 34 |
| Lower Failure Value Link A | 0 | 70 | 70 | 70 | 34 |
| Upper Failure Value Link B | 70 | 105 | 70 | 70 | 34 |
| Lower Failure Value Link B | 70 | 35 | 70 | 70 | 34 |
| Upper Failure Value Link C | 70 | 70 | 105 | 70 | 34 |
| Lower Failure Value Link C | 70 | 70 | 35 | 70 | 34 |

9,659,143 B2

METHOD FOR ANALYZING THE ROBUSTNESS OF COMPONENTS WITHIN A VEHICULAR MECHANICAL SYSTEM TO CALCULATE OUT-OF-SPECIFICATION ROBUSTNESS

FIELD OF THE INVENTION

The present invention generally relates to a method for analyzing mechanical systems within a vehicle, and more specifically, a method for analyzing the robustness of various components within a mechanical system during operation of a primary function of that mechanical system.

BACKGROUND OF THE INVENTION

In designing various automobiles, designers seek to make particular mechanical systems have a particular robustness, such as a designed safety factor or a design parameter range that will allow for variations in manufactured parts. In order to achieve these values, designers typically select a predetermined figure or robustness factor that the system is sought to achieve. The components of the mechanical system are then designed in order to achieve this predetermined robustness value. In various instances, the predetermined robustness values used in designing vehicles can be a somewhat arbitrary number based upon older designs.

SUMMARY OF THE INVENTION

According to one aspect of the present invention, a method for increasing the robustness of a vehicular mechanism includes the steps of determining at least one primary function of a vehicular mechanism and identifying functional components of the vehicular mechanism used during the respective at least one primary function. The method also includes analyzing each functional component during performance of each at least one primary function under in-specification conditions, analyzing each functional component during performance of each at least one primary function under decreasing out-of-specification conditions to determine a lower failure value for each functional component and analyzing each functional component during performance of each at least one primary function under increasing out-of-specification conditions to determine an upper failure value for each functional component. The method also includes the steps of determining a modified robustness value for each functional component, wherein the modified robustness value is between the lower and upper failure values and modifying at least one functional component in the vehicular mechanism such that each functional component of the vehicular mechanism has a robustness that is approximately the modified robustness value of the respective functional component.

According to another aspect of the present invention, a method for increasing the robustness of a vehicular mechanism includes the steps of analyzing components of each primary function of a vehicular mechanism under in-specification conditions. The method also includes analyzing the components under out-of-specification conditions to determine at least one failure value for each component. Also included in the method is the step of modifying each component to include a robustness that is approximately the component's modified robustness value, being proximate the at least one failure value.

According to another aspect of the present invention, a method for increasing the robustness of a vehicular mechanism includes the steps of selecting a vehicular mechanism having a first overall robustness, determining primary functions of the vehicular mechanism, and identifying components of the vehicular mechanism used during at least one of the primary functions, wherein each component has a base robustness value. The method also includes analyzing each component during performance of each at least one primary function under in-specification conditions, including maximum in-specification conditions and minimum in-specification conditions. Also included is the steps of analyzing each component during performance of each at least one primary function under decreasing out-of-specification conditions to determine a lower failure value for each component and analyzing each component during performance of each at least one primary function under increasing out-of-specification conditions to determine an upper failure value for each component. The method also includes the steps of determining a modified robustness value for each component wherein the modified robustness value is between the lower and upper failure values and modifying at least one component in the vehicular mechanism such that each component of the vehicular mechanism has a robustness changed from the base robustness value to approximately the component's respective modified robustness value.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
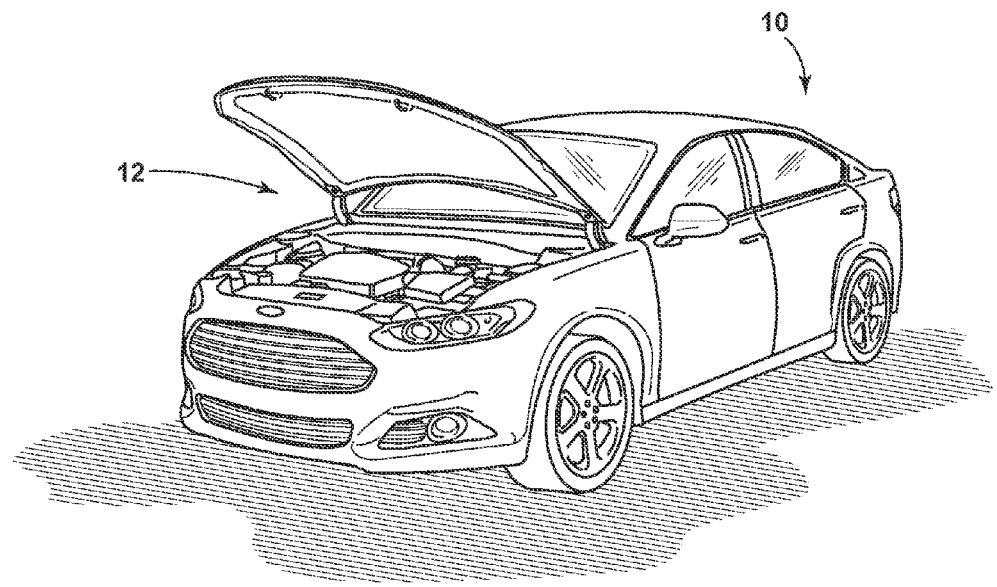
FIG. 1 is a front perspective view of a vehicle that has incorporated an embodiment of the method for analyzing the out-of-specification robustness of a vehicular mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
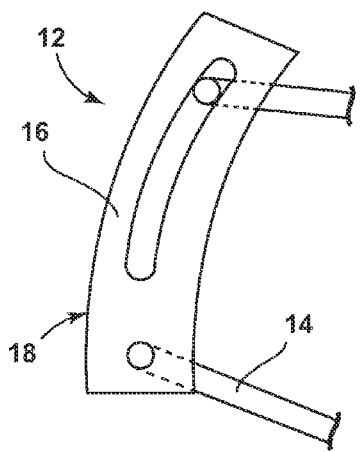
FIG. 2 is a schematic of an example vehicular mechanism showing an in-specification component.
Figure 3:
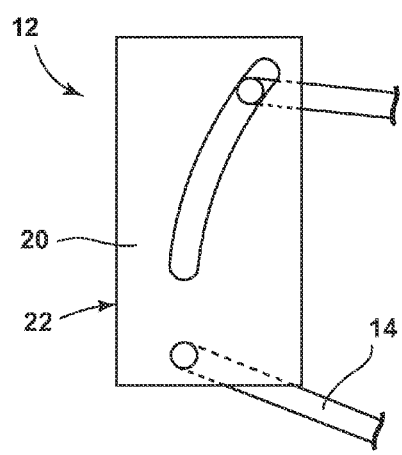
FIG. 3 is a schematic of an example vehicular mechanism showing an out-of-specification component.
Figure 4:
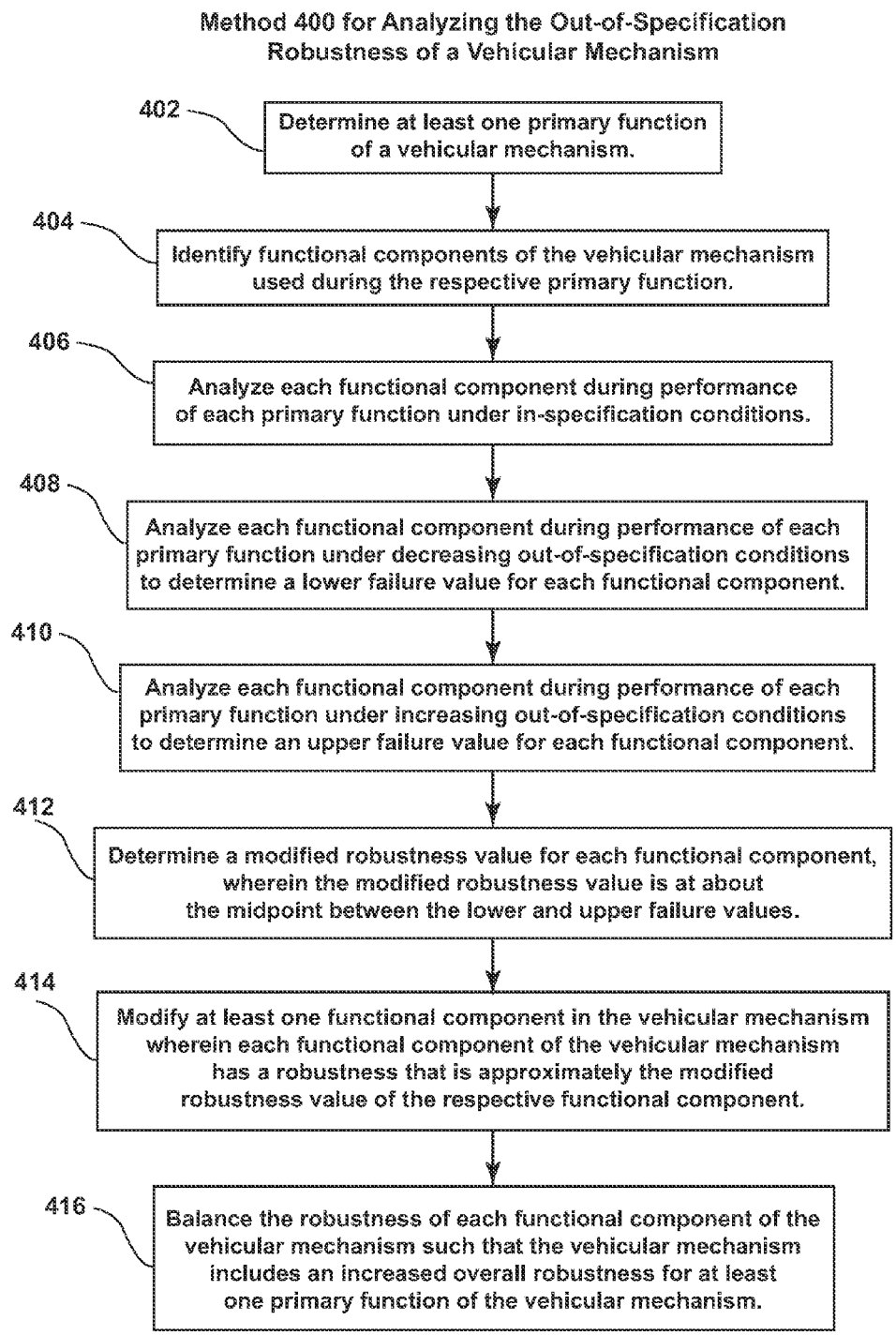
FIG. 4 is a schematic flow diagram of one embodiment of the method for analyzing the out-of-specification robustness of a vehicular mechanism.

As illustrated in FIGS. 1-3, reference numeral 10 generally refers to a vehicle that is designed using an embodiment of the method described herein. The vehicle 10 includes various vehicular mechanisms 12 wherein each vehicular mechanism 12 includes one or more primary functions that the vehicular mechanism 12 is designed to perform. In designing the vehicle 10, each component 14 of a given vehicular mechanism 12 is designed to incorporate various design parameters and ranges within which each component 14 is intended to be manufactured. In most cases, the various components 14 of a particular vehicular mechanism 12 are manufactured within the design parameters and ranges. In these circumstances, the in-specification component 16 of the vehicular mechanism 12 is operating in an in-specification condition 18, where the various components 14 of the vehicular mechanism 12 are manufactured as designed.

Referring again to FIGS. 2-3, under certain circumstances, the suppliers of the various components 14 of the vehicular mechanisms 12, for any one of numerous reasons, do not manufacture one or more particular components 14 to be within the design parameters or ranges for that particular vehicular mechanism 12, resulting in out-of-specification components 20. When these out-of-specification components 20, which are outside of the designed parameters and ranges, are installed within the vehicular mechanism 12, the particular vehicular mechanism 12, when performing one or more of its primary functions, operates in an out-of-specification condition 22. In some cases, an out-of-specification component 20 can be identified before it is integrated into the vehicular mechanism 12 of the vehicle 10, such that an in-specification component 16 that is within the design parameters can be manufactured and installed. In other circumstances, it may be difficult to identify an out-of-specification component 20, such as when a modified material is used or the dimensional differences are relatively minute, as well as other reasons, such that identification of an out-of-specification component 20 can be difficult. Such situations where an out-of-specification component 20 is installed within the vehicle 10 can result in vehicle 10 recalls where components 14 must be replaced within the vehicle 10 after being manufactured or after market.

As shown in FIGS. 1-4, a method 400 for increasing a robustness of a vehicular mechanism 12 within a vehicle 10 includes the step 402 of determining at least one primary function of a vehicular mechanism 12. The method 400 also includes the step 404 of identifying functional components 14 of the vehicular mechanism 12 used during the respective primary function. Another step 406 in the method 400 includes analyzing each functional component 14 during performance of each primary function under in-specification conditions 18. Another step 408 in the method 400 includes analyzing each functional component 14 during performance of each primary function under decreasing out-of-specification conditions 22 to determine a lower failure value 24 (shown in FIGS. 14 and 16) for each functional component 14. Also, the method 400 includes step 410 for analyzing each functional component 14 during performance of each primary function under increasing out-of-specification conditions 22 to determine an upper failure value 26 (shown in FIGS. 8-12, 14 and 16) for each functional component 14. According to the method 400, the next step 412 includes determining a modified robustness value 28 (shown in FIGS. 12 and 16) for each functional component 14, wherein the modified robustness value 28 is between the lower and upper failure values 24, 26. The method 400 also includes the step 414 of modifying at least one functional component 14 in the vehicular mechanism 12 such that each functional component 14 of the vehicular mechanism 12 has a robustness that is approximately the modified robustness value 28 of the respective functional component 14. The method 400 can also include the step 416 of balancing the robustness of each functional component 14 within the vehicular mechanism 12 such that the vehicular mechanism 12 has a modified overall robustness (shown in FIG. 16) for at least one primary function of the vehicular mechanism 12.

In the various embodiments, the types of vehicular mechanisms 12 that can be designed using this method include any vehicular mechanism 12 with moving components 14. These vehicular mechanisms 12 can include, but are not limited to, structural mechanisms, mechanisms within the drive train, accessory mechanisms, suspension mechanisms, steering mechanisms, and any other mechanism having moving components 14.

As illustrated in FIGS. 4-17, the various embodiments of the method described herein serve to analyze the robustness of a particular vehicular mechanism 12 during the performance of its primary function or functions under both in-specification and out-of-specification conditions 18, 22. In this manner, the various components 14 of the vehicular mechanism 12 can be modified and balanced in order to make each component 14 and the entire vehicular mechanism 12 more robust, to account for situations where an out-of-specification component 20 is manufactured and installed within the vehicle 10. The use of the method described herein serves to lessen the occurrence of recalls of out-of-specification components 20 by accounting for such out-of-specification components 20 that may be manufactured outside of the design parameters by a certain degree.

Figure 5:
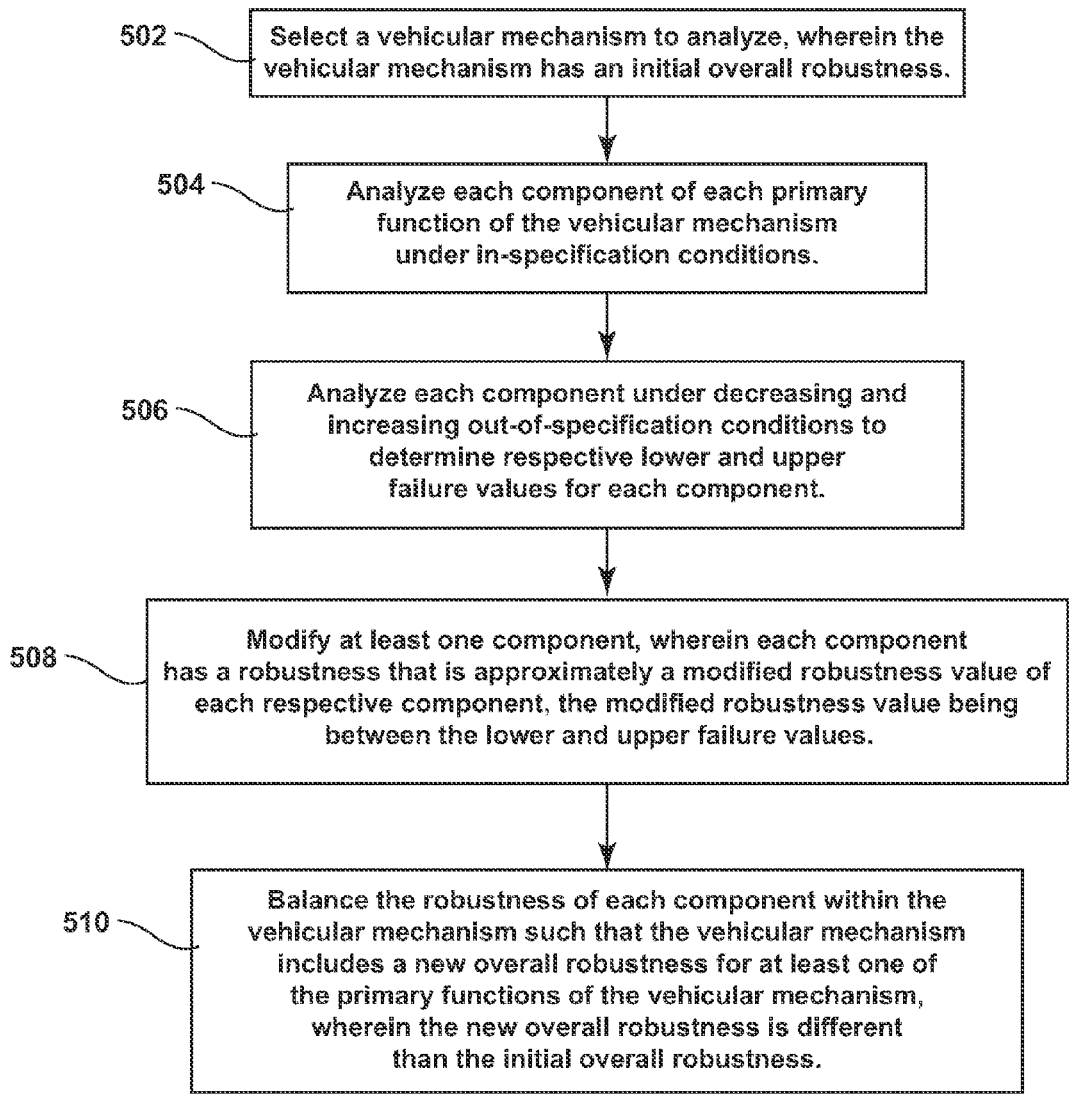
FIG. 5 is a schematic flow diagram of another embodiment of the method for analyzing the out-of-specification robustness of a vehicular mechanism.

As illustrated in FIG. 5, an alternate embodiment of the method 500 for analyzing the out-of-specification robustness of a vehicular mechanism 12 includes step 502 for selecting a vehicular mechanism 12 to analyze. The method 500 also includes the step 504 for analyzing each component 14 as to each primary function of the vehicular mechanism 12 under in-specification conditions 18. Step 506 of the method includes analyzing the components 14 under out-of-specification conditions 22 to determine at least one failure value, such as the lower and upper failure values 24, 26 for each component 14. Step 508 of the method includes modifying at least one component 14, wherein each component 14 of the vehicular mechanism 12 has a robustness that is approximately a modified robustness value 28 for that, respective, component 14, wherein the modified robustness value 28 is proximate the at least one failure value. The method 500 can also include step 510 for balancing the robustness of each component 14 within the vehicular mechanism 12 such that the vehicular mechanism 12 includes a new overall robustness for at least one of the primary functions of the vehicular mechanism 12, wherein the new overall robustness is different than an initial overall robustness of the vehicular mechanism 12.

Figure 6:
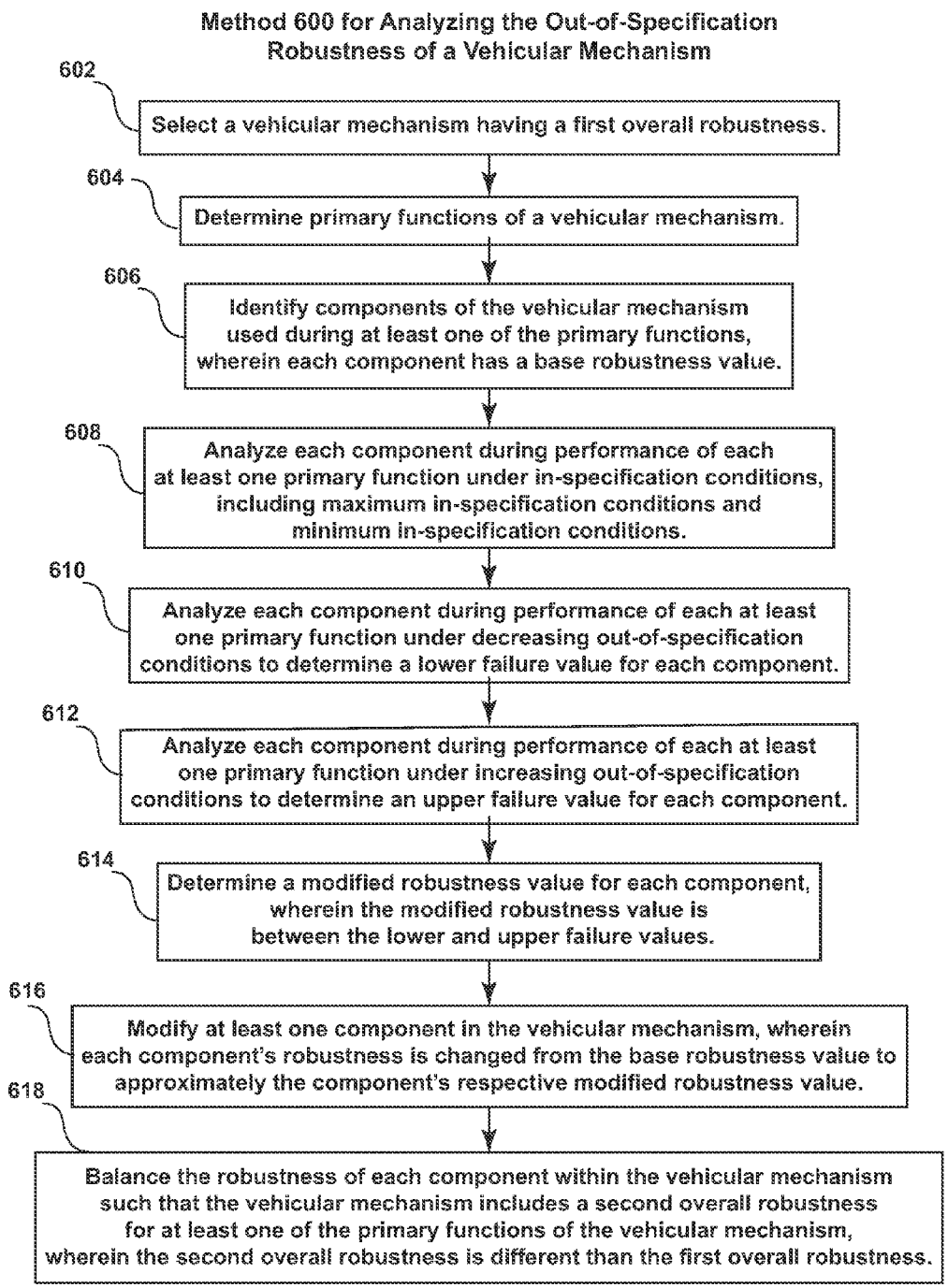
FIG. 6 is a schematic flow diagram of another embodiment of the method for analyzing the out-of-specification robustness of a vehicular mechanism.

Referring now to FIG. 6, another alternate embodiment of the method 600 for analyzing the out-of-specification robustness of a vehicular mechanism 12 includes step 602 for selecting the vehicular mechanism 12 having a first overall robustness. The method 600 also includes step 604 for determining the primary functions of the vehicular mechanism 12. Step 606 includes identifying components 14 of the vehicular mechanism 12 used during at least one of the primary functions, wherein each component 14 has a base robustness value 40 (shown in FIG. 17). Step 608 includes analyzing each component 14 during performance of each primary function under in-specification conditions 18, including minimum and maximum in-specification conditions 18. Step 610 includes analyzing each component 14 during performance of each primary function under decreasing out-of-specification conditions 22 in order to determine a lower failure value 24 for each component 14. Step 612 includes analyzing each component 14 during performance of each primary function under increasing out-of-specification conditions 22 to determine an upper failure value 26 for each component 14. Step 614 of method 600 includes determining a modified robustness value 28 for each component 14, wherein the modified robustness value 28 is between the lower and upper failure values 24, 26. Step 616 of the method 600 includes modifying at least one component 14 in the vehicular mechanism 12, such that each component 14 of the vehicular mechanism 12 has a robustness that is changed from the base robustness value 40 to approximately the respective modified robustness value 28 of the component 14. In various embodiments, the method 600 can also include step 618 that includes balancing the robustness of each component 14 within the vehicular mechanism 12, such that the vehicular mechanism 12 includes a second overall robustness for at least one of the primary functions of the vehicular mechanism 12, wherein the second overall robustness is different than the first overall robustness.

In the various embodiments, it is contemplated that for any component 14 of the vehicular mechanism 12, the modified robustness value 28 may be higher or lower than the base robustness value 40. The type of modification, as will be described more fully below, depends on the results of the method under both in-specification and out-of-specification conditions 18, 22.

In the various embodiments, it is contemplated that the modified robustness value 28 can be determined according to some calculation other than finding the midpoint between the lower and upper failure values 24, 26. It is contemplated that the calculation can be different based upon the particular characteristics that are being modified. By way of explanation and not limitation, a modification of a component 14 above the in-specification conditions 18 may have a greater impact than a modification of the same component 14 below the in-specification conditions 18. Put another way, a small increasing change may have a great impact and a large decreasing change may have a small impact. In various embodiments, such as this, the modified robustness value 28 may be a calculation of several lower and upper failure values 24, 26 for each primary function. Where this is the case, the modified robustness value 28 may be calculated by any one of several calculations that can include, but are not limited to, the mean, median, mode, the range, a percentage, function, an algorithm, or some other mathematical computation or process.

Referring now to FIGS. 7-12, by way of explanation, and not limitation, the illustrated curves reflect a sample analysis performed on a vehicular mechanism 12 with three components 14 while performing a primary function of that vehicular mechanism 12. The graphs represent the results of an example analysis of each individual component 14, under in-specification and out-of-specification conditions 18, 22, as well as an analysis of the vehicular mechanism 12 as a whole. The various graphs include vertical axes showing the design parameter ranges by indicating a lower specification limit (LSL) 50 and an upper specification limit (USL) 52. The various graphs are not to scale and it is contemplated that each component 14 can have a different LSL 50, USL 52, or both.

Figure 7:
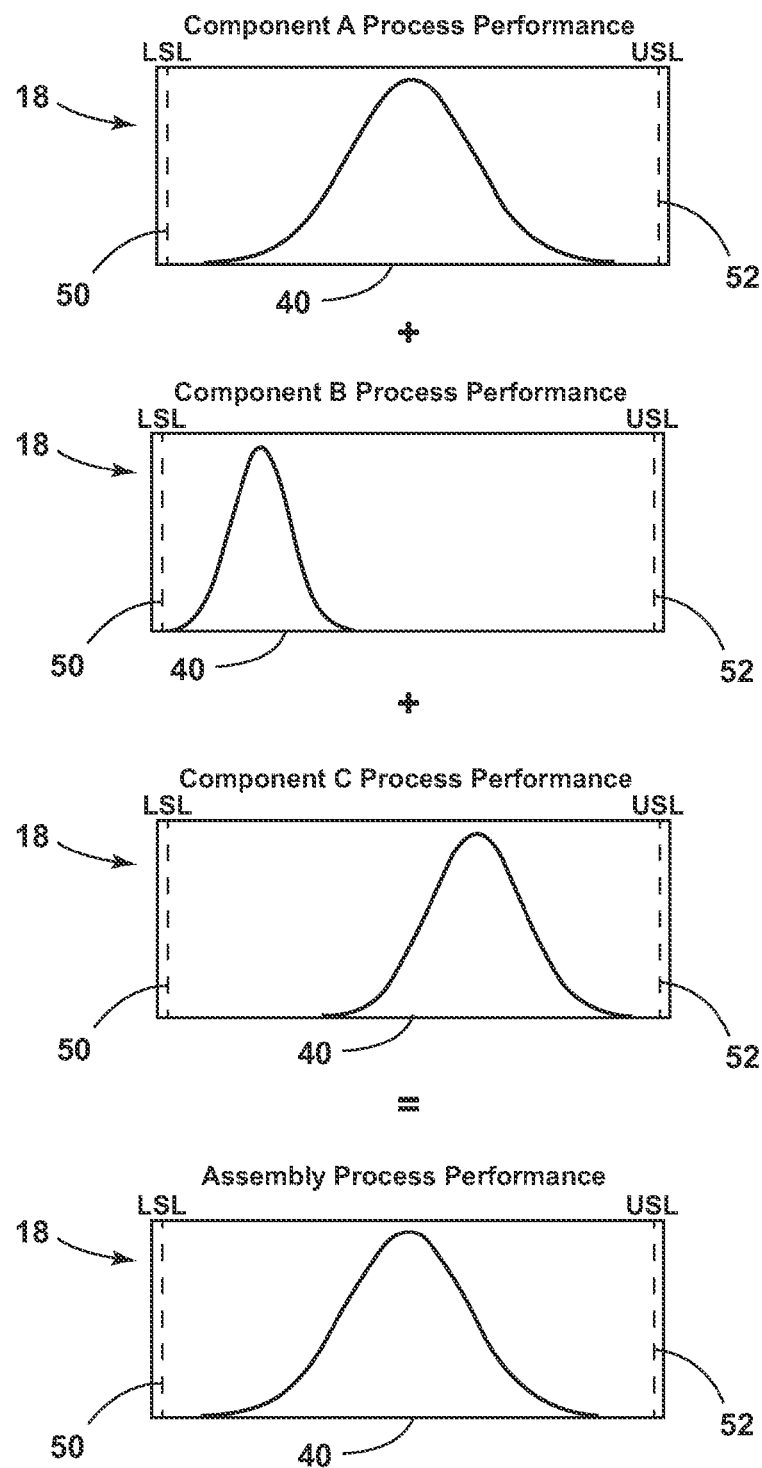
FIG. 7 is a schematic diagram reflecting performance of a step of one embodiment of the method, wherein the components of a vehicular mechanism are analyzed under in-specification conditions.

Referring now to the embodiment illustrated in FIG. 7, the graphs illustrate the results of a sample analysis performed on a vehicular mechanism 12 in an embodiment of the method, wherein each component 14 is analyzed during the performance of one or more primary functions under in-specification conditions 18. That is, where each component 14 is an in-specification component 16 manufactured to be within the various design parameters and ranges. This step of the method can include analyzing each in-specification component 16 under a variety of in-specification conditions 18, including, but not limited to, minimum and maximum in-specification conditions 18 and any one of various conditions between. The illustrated graphs reflect that the vehicular mechanism 12, as designed, is sufficiently robust to account for in-specification conditions 18 as each of the curves representing the analysis of each individual component 14 resides between the respective LSL 50 and the USL 52 for each component 14. Additionally, the cumulative robustness graph of the vehicular mechanism 12 as a whole under in-specification conditions 18 indicates that the entire system is sufficiently robust to accommodate in-specification components 16. It is contemplated that if one or more of the in-specification components 16 indicates a failure during performance under in-specification conditions 18, wherein the curve of one or more of the graphs extends to the left, or below, the LSL 50 or to the right, or above, the USL 52, that a redesign of the vehicular mechanism 12 may be considered as the analysis indicates that the vehicular mechanism 12 may not be sufficiently robust to accommodate in-specification conditions 18, let alone out-of-specification conditions 22.

Figure 8:
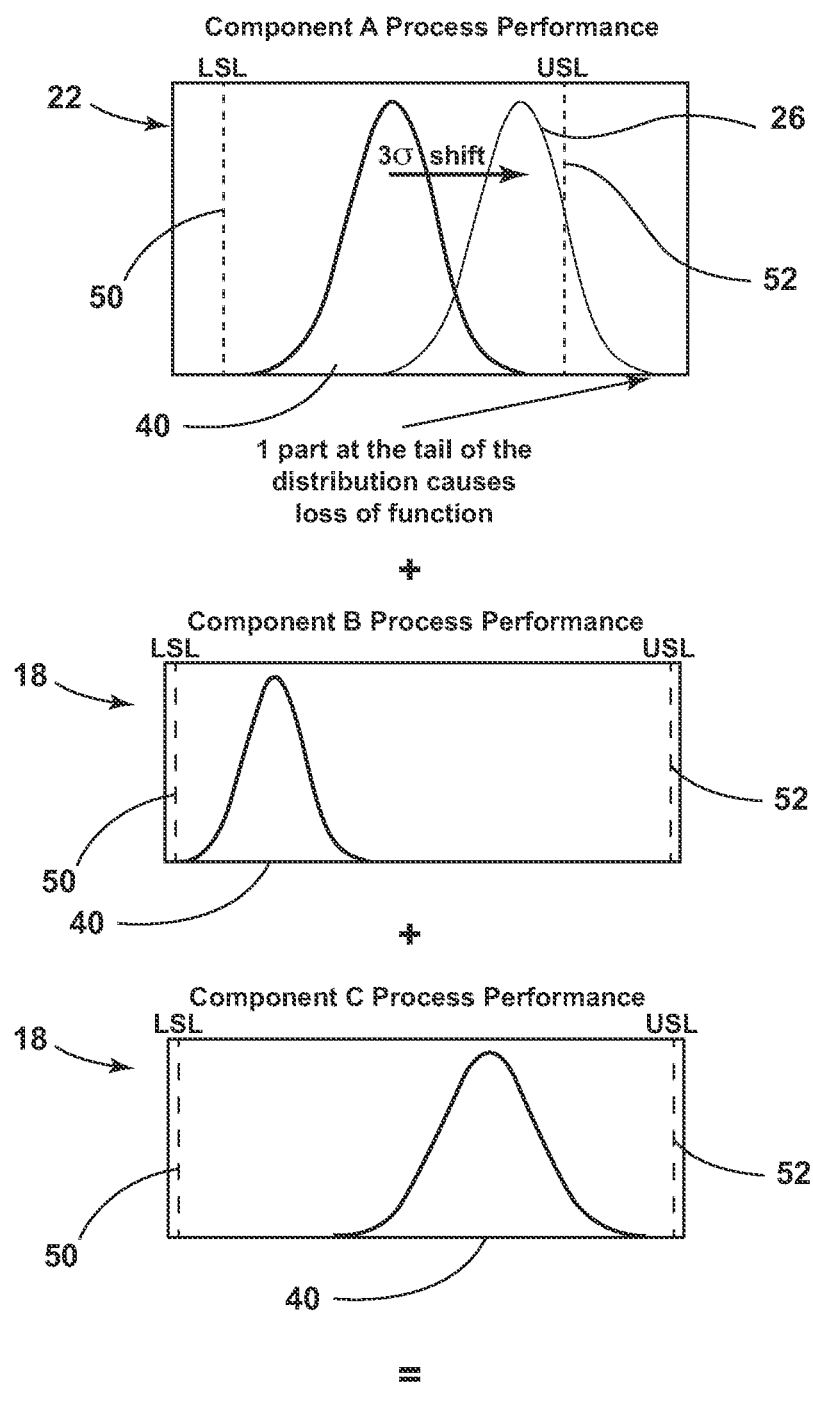
FIG. 8 is a schematic diagram reflecting performance of a step of one embodiment of the method, wherein component A of a vehicular mechanism is analyzed under out-of-specification conditions.
Figure 9:
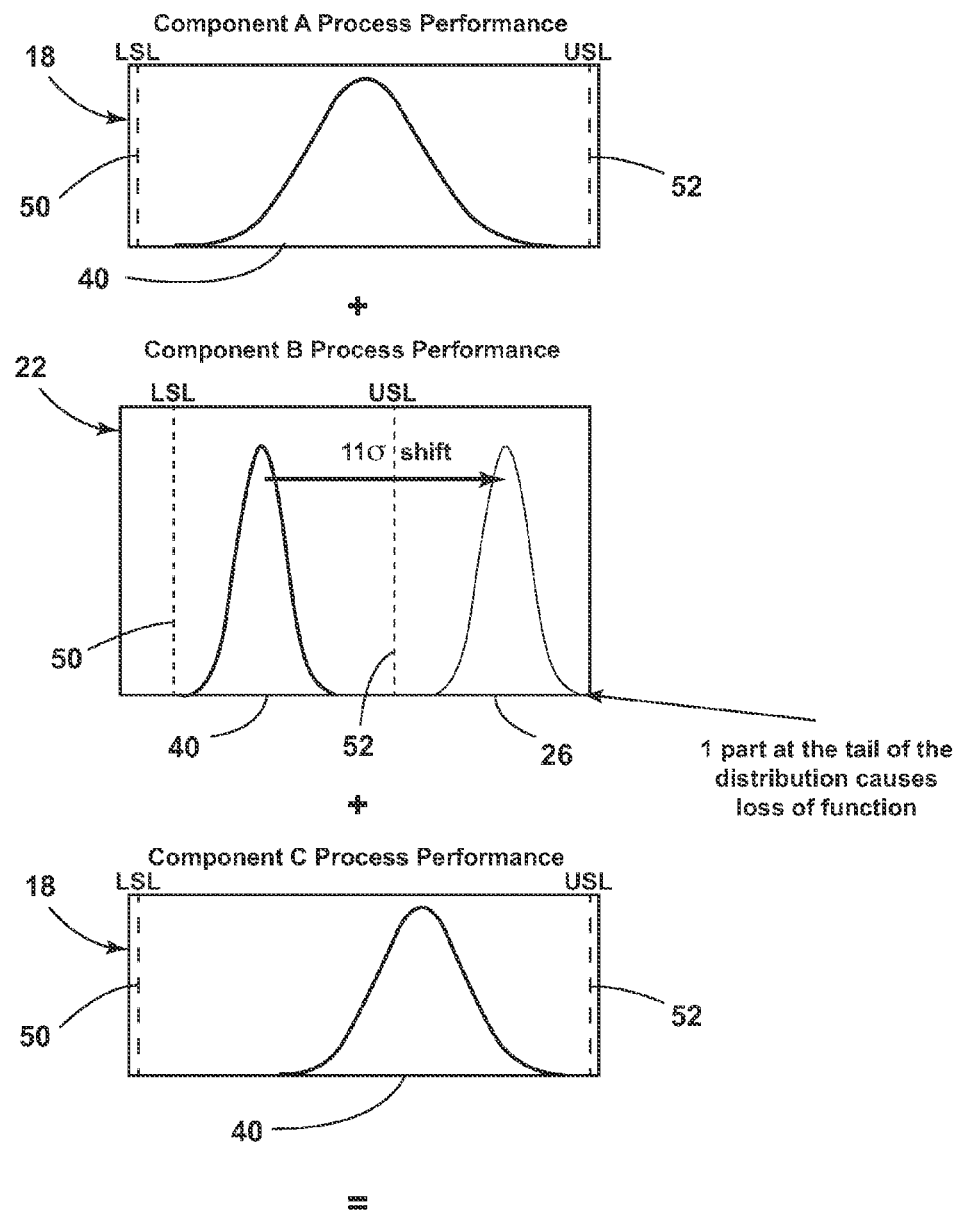
FIG. 9 is a schematic diagram reflecting performance of a step of one embodiment of the method, wherein component B of a vehicular mechanism is analyzed under out-of-specification conditions.
Figure 10:
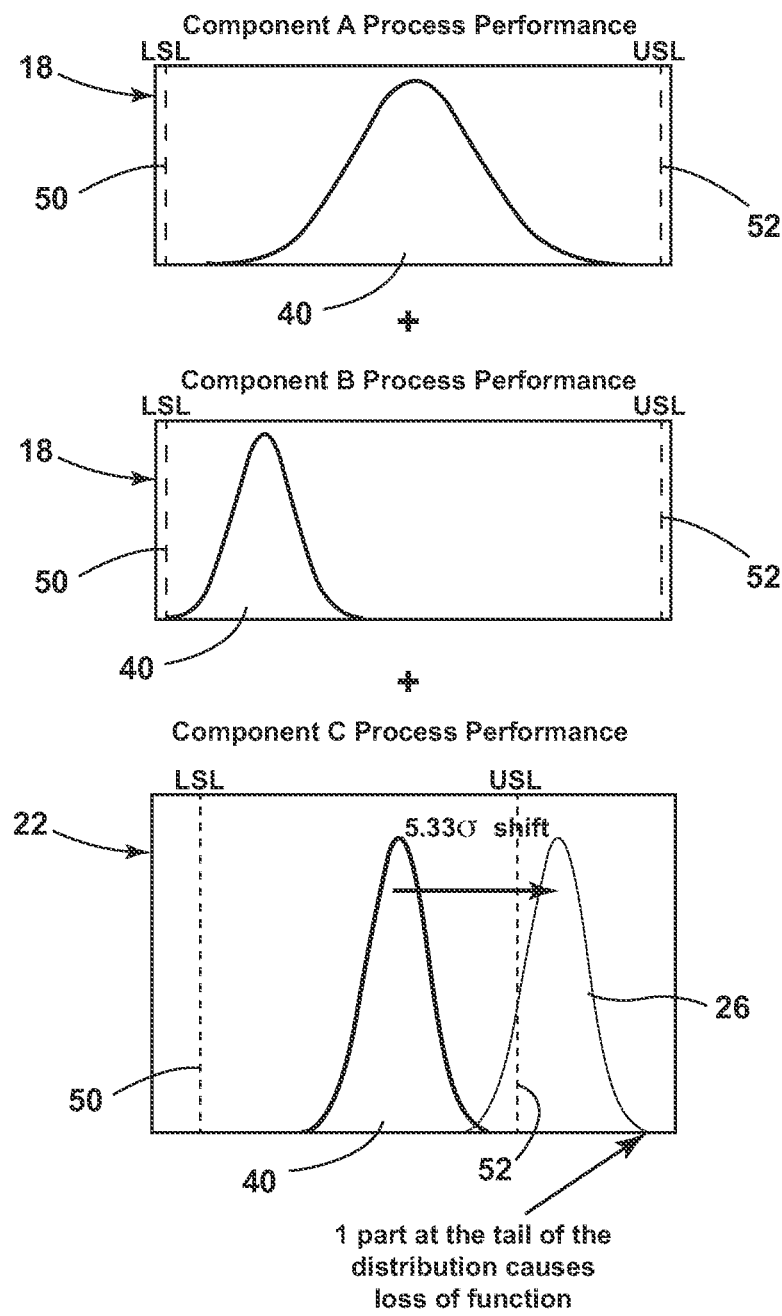
FIG. 10 is a schematic diagram reflecting performance of a step of one embodiment of the method, wherein component C of a vehicular mechanism is analyzed under out-of-specification conditions.

Referring now to the embodiment illustrated in FIGS. 8-10, the various parameters of each component 14 of the vehicular mechanism 12 are modified to reflect various out-of-specification conditions 22. These out-of-specification conditions 22 can include at least one out-of-specification component 20 that has at least one component parameter that is outside of the design parameters of that particular component 14. The out-of-specification condition 22 can include a change in material or a change in one or more of the dimensional characteristics of the component 14 including, but not limited to, thickness, length, width and others. The component parameters are continually increased and decreased outside of in-specification conditions 18 into progressively greater out-of-specification conditions 22 until functional failure of the entire vehicular system occurs during a primary function, analytically. The point at which the functional failure occurs is measured and assigned a value, being the upper failure value 26 and lower failure value 24. These values can include various incremental measurements that can include, but are not limited to, percentages, a predetermined scale, standard deviations (indicated by "a" in FIGS. 8-12), as well as others. Where a standard deviation is used as the value measurement, the number of standard deviation shifts, upward or downward, are measured from the in-specification condition 18 in order to determine the upper failure value 26 of modified standard deviations and the lower failure value 24 of decreased standard deviations. In various embodiments, a standard deviation can be represented by an individualized factor that is unique to each component 14 of the vehicular mechanism 12. A standard deviation can account for various materials, sizes, orientations, positions within a vehicular mechanism 12, and different manufacturing processes. By way of explanation, and not limitation, a plastic component 14 can typically have a smaller standard deviation and a metal component 14 can typically have a larger standard deviation. The standard deviation can also be based upon historical figures for similarly designed parts for similar vehicular mechanisms 12 and components 14 of the vehicular mechanism 12.

Referring again to FIG. 8, the analysis of component A in the non-limiting example reflects that the upper failure value 26 for component A is three increasing standard deviations. This process is repeated for component A except that the parameters of the component 14 are progressively decreased to out-of-specification conditions 22 below the LSL 50 for component A, to determine a number of decreasing standard deviations or a lower failure value 24 at which functional value occurs, analytically, due to the progressively decreasing out-of-specification conditions 22.

Referring now to the embodiment illustrated in FIGS. 9 and 10, the process of determining the upper and lower failure values 26, 24 is repeated for component B for each primary function. According to the non-limiting example, the analysis determined that the upper failure value 26 of component B occurs at 11 increasing standard deviations. Again, this process is repeated for component C where the analysis determines that the upper failure value 26 for component C occurs at 5.33 increasing standard deviations. As discussed above, the process is repeated for each component 14 and for each primary function by increasing the out-of-specification conditions 22 to arrive at an upper failure value 26 of increasing standard deviations, and decreasing the out-of-specification conditions 22 to arrive at a lower failure value 24 of decreasing standard deviations. The use of increasing and decreasing out-of-specification conditions 22 is repeated for each component 14 of the vehicular mechanism 12 and for each primary function of that vehicular mechanism 12 until upper and lower failure values 26, 24 for each are gathered. In this manner, a set of upper failure values 26 and lower failure values 24 are collected for each primary function.

Figure 11:
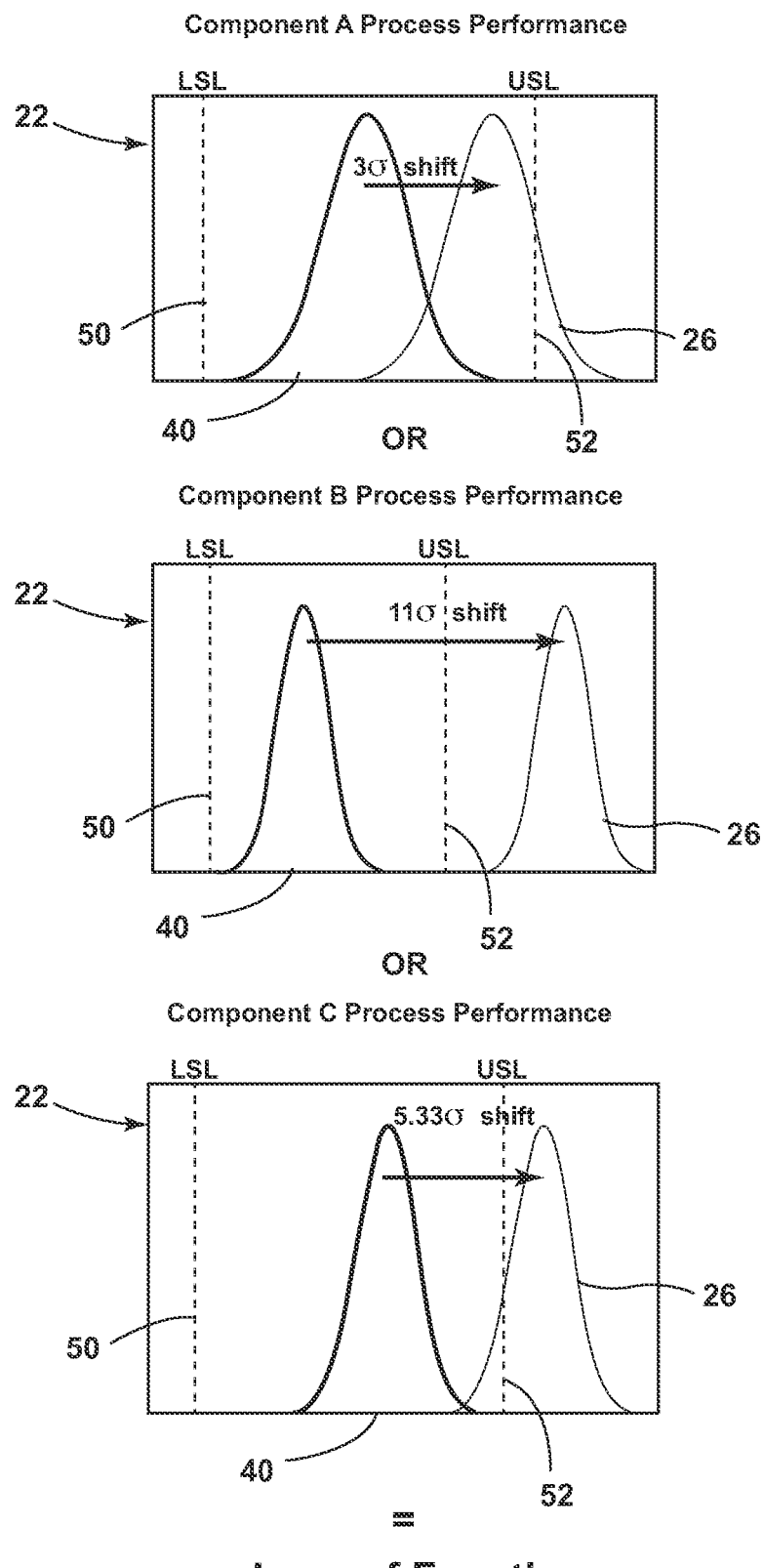
FIG. 11 is a schematic diagram showing the various failure values of the components of a vehicular mechanism after analyzing each component under out-of-specification conditions according to one embodiment of the method.

Referring now to the embodiment illustrated in FIG. 11, using the upper failure values 26 of components A, B and C, it is determined that the design is robust up to an upward limit of three standard deviations. Even though the component B appears to be robust up to 11 increasing standard deviations, the system, as a whole, will fail after three increasing standard deviations because the design is only as robust as its weakest link, in this case, component A. The results of this analysis of out-of-specification condition 22 can, in various embodiments, indicate where certain components 14 are over-robust. This may also indicate where components 14 of a particular vehicular mechanism 12 can be manufactured in a different way, or be made of a different material, or be sized differently to make each component 14 more efficient and to manufacture each component 14 more economically.

Figure 12:
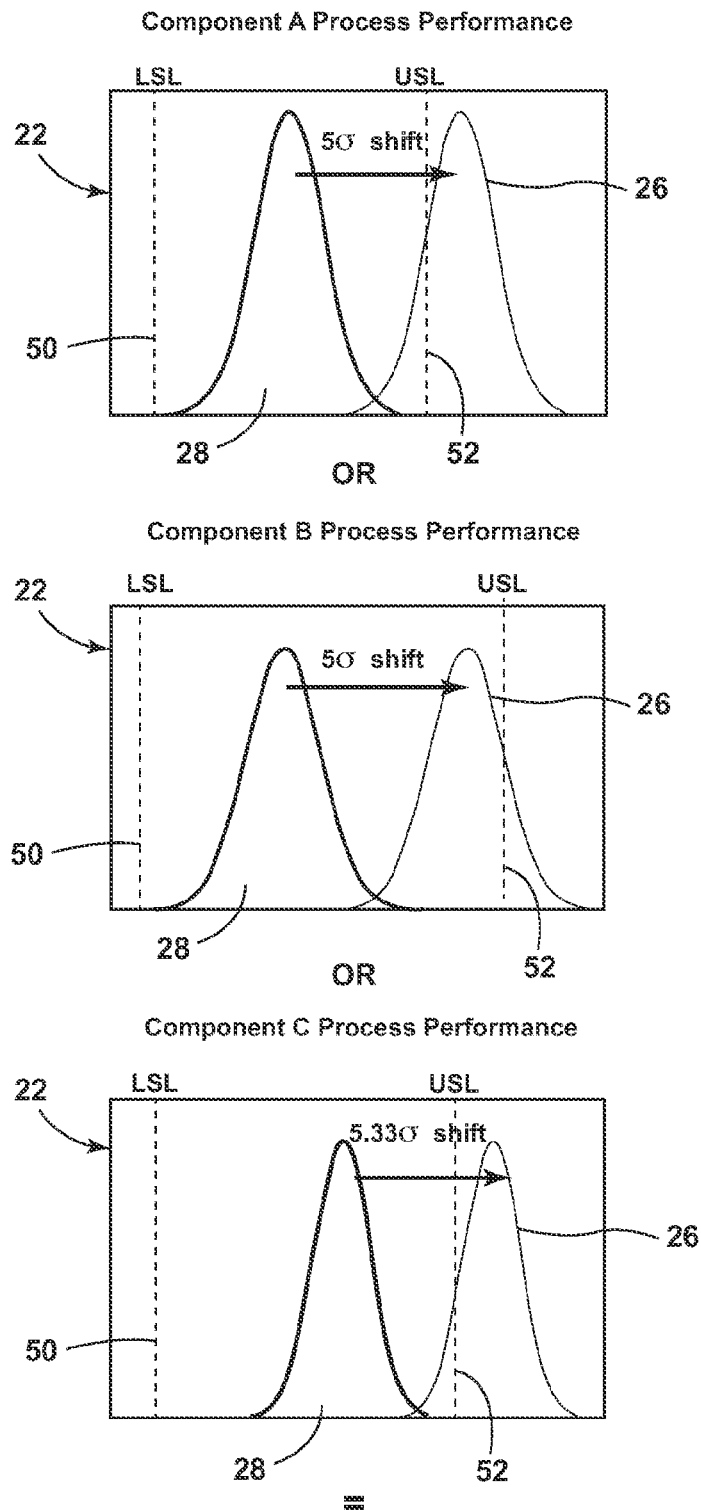
FIG. 12 is a schematic diagram showing the new robustness values of components of a vehicular mechanism after performing one embodiment of the method.

Referring now to the embodiment illustrated in FIG. 12, the various embodiments of the method include the step of modifying one or more components 14 and balancing the robustness of each component 14 within the vehicular mechanism 12. In this manner, the vehicular mechanism 12 can be redesigned to have a modified overall robustness for the various primary functions of the vehicular mechanism 12. Additionally, each component 14 of the vehicular mechanism 12 can be modified such that its modified robustness value 28 is designed to be at about the midpoint between the upper failure value 26 and the lower failure value 24, or can be determined by some other mathematical calculation or process as described above. This modification step results in each component 14 having a modified robustness value 28 where the number of increasing standard deviations and the number of decreasing standard deviations are approximately the same within each particular component 14, and the vehicular mechanism 12 as a whole.

It is contemplated that, in various embodiments, the step of modifying each component 14 of the vehicular mechanism 12 can include changing, by increasing or decreasing, at least one dimension of the particular component 14. Additionally, the step of modifying each component 14 can include changing at least one of the materials or material characteristics of the particular component 14. It is further contemplated that additional modifications to change the robustness of a particular component 14 can be implemented, wherein such modifications can include, but are not limited to, modifying the density, weight distribution, center of gravity, positioning relative to the other components 14, as well as other similar modifications. According to the non-limiting example, component A has been modified to have an increased modified robustness value 28, which can be accomplished by increasing the size of component A, or one of the other modifications described above. Additionally, component B has been modified such that it has a decreased modified robustness value 28, wherein component B may include less material, or may be made from material that has a decreased strength. By balancing each component 14 of the vehicular mechanism 12 and the vehicular mechanism 12 as a whole, the entire system becomes more robust and is more able to account for out-of-specification components 20 provided by a manufacturer. According to the non-limiting example, as illustrated in FIG. 12, the sample vehicular mechanism 12 has been modified and balanced to have a robustness of five increasing standard deviations.

It is contemplated that one or more steps of the method can be performed by a computer having a processor, wherein the computer is configured to perform a program, algorithm or other automated process for completing the method. It is further contemplated that certain physical testing may be used in conjunction with the computer-based testing to perform the various steps of the method.

In the various embodiments where computer-based testing is used, computer models of the vehicular mechanism 12 and its components 14, such as CAD, mechanical design automation, electronic design automation, vector models, among others, can be tested virtually while performing one or more primary functions of the vehicular mechanism 12. This computer-based virtual analysis can be used to derive the lower and upper failure values 24, 26. These virtually derived lower and upper failure values 24, 26 can, in turn, be used to derive the modified robustness value 28. The modified robustness value 28 can then be used to modify each component 14 and balance the vehicular mechanism 12, again, virtually. This virtual analysis can allow components to be manufactured, from the start, having the modified robustness value 28 and being balanced according to the method before any physical testing has occurred.

It is contemplated, as illustrated in the various embodiments, that each vehicular mechanism 12 can have one or more primary functions. In such a case, the in-specification and out-of-specification robustness analysis, as described above, is repeated for each primary function of the vehicular mechanism 12. As such, where a particular vehicular mechanism 12 has multiple primary functions, it can be difficult to achieve a balanced vehicular mechanism 12 where each component 14 has a robustness value that is at approximately the midpoint between the upper and lower failure values 26, 24 for each primary function. Accordingly, the step of balancing the vehicular mechanism 12, as described above, may result in a modified robustness value 28 that is near to the midpoint between the upper and lower failure value 26, 24. Where the entire system is balanced after conducting the various embodiments of the method, the entire system is configured to perform all of the primary functions properly, even where one or more components 14 is manufactured out-of-specification to a certain degree. The balancing process, in this manner, makes the vehicular mechanism 12 better equipped to handle out-of-specification conditions 22 where such out-of-specification components 20 are manufactured and installed within the vehicle 10. In various embodiments of the method, the results of the method can create a vehicular mechanism 12 that is configured to account for components 14 that are out-of-specification to a relatively low degree, where the out-of-specification condition 22 may be somewhat difficult to discern. It is contemplated that the various embodiments of the method can also result in a more robust vehicular mechanism 12 that can accommodate components 14 that are out-of-specification to a larger degree without resulting in the failure or diminished performance of one or more of the primary functions of the vehicular mechanism 12.

Figures 13, 14:
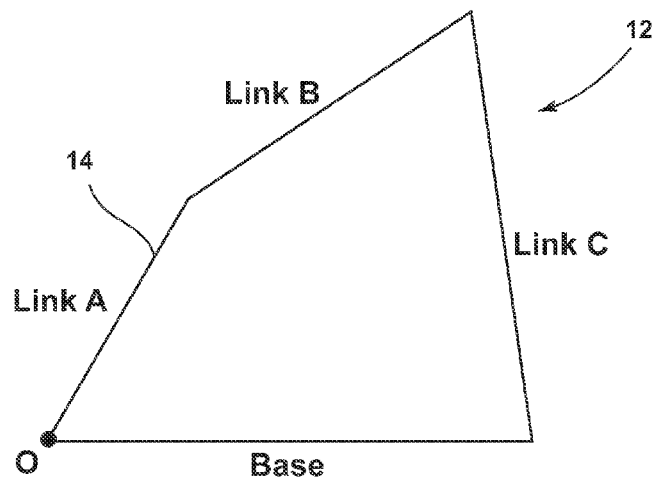
FIG. 13 is a schematic diagram of a non-limiting example of a vehicular mechanism.
FIG. 14 is a chart showing the results of an embodiment of the method performed on the vehicular mechanism of FIG. 13, before modifying any components according to an embodiment of the method.

Referring now to the embodiment illustrated in FIGS. 13-17, an additional non-limiting example is illustrated to convey the various steps of the embodiments of the method, as described above. This second non-limiting example includes a four-bar linkage that is designed to allow for 360° clockwise rotation about point O. The method for analyzing the robustness of a vehicular mechanism 12, according to the embodiments described herein, is applied to each component 14 of the four-bar linkage. The chart of FIG. 14 illustrates the results of this analysis, after in-specification and out-of-specification conditions 22 have been analyzed, but before any modification or balancing of component 14 has taken place. According to the method, the currently designed four-bar linkage is robust only to one standard deviation, as indicated by the upper and lower failure values 26, 24 of links A, B and C.

Figures 15, 16:
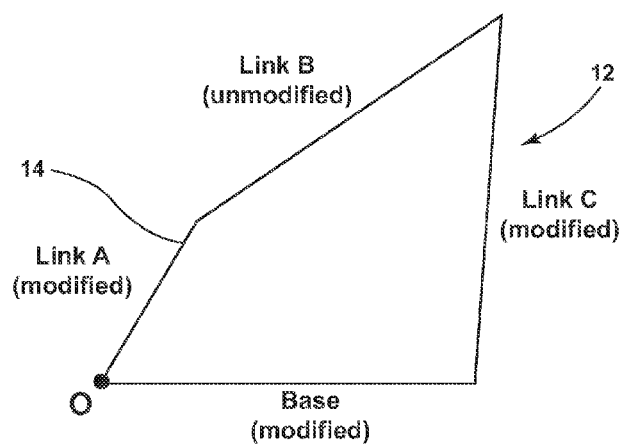
FIG. 15 is a schematic diagram of the example vehicular mechanism of FIG. 13 after the components of the vehicular mechanism have been modified according to an embodiment of the method.
FIG. 16 is a chart showing the results of one embodiment of the method performed on the modified vehicular mechanism of FIG. 15 after the components have been modified according to the method.
Figure 17:
FIG. 17 is a chart comparing the components of a vehicular mechanism before and after modification according to an embodiment of the method.

Referring now to the embodiment illustrated in FIGS. 15-16, the four-bar linkage shown illustrates the same linkage of FIGS. 13-14, after balancing where link A, link C and the base are modified to have different dimensions. As noted above, the analysis and modification of the components 14 and the vehicular mechanism 12 can be accomplished using computer models and computer-based analysis of these models. Due to the modification and balancing of the vehicular mechanism 12, the analysis chart represented by FIG. 16 indicates that the vehicular mechanism 12 is now robust by a factor of 34 increasing and decreasing standard deviations throughout the entire vehicular mechanism 12. The balanced system, as compared to the unbalanced system, is far more capable of incorporating an out-of-specification component 20 without experiencing failure or diminished performance of a primary function due to the out-of-specification component 20 being included within the vehicular mechanism 12. As illustrated in the charts represented in FIGS. 16-17, the vehicular mechanism 12 that has been balanced according to the various embodiments of the method is now able to accommodate multiple out-of-specification conditions 22 within the same vehicular mechanism 12, without experiencing failure during one or more of the primary functions.

In various embodiments of the method described above, it is contemplated that even in simple cases, such as the four-bar linkage described above, the results of the method can be complex. After the method is performed and each component 14 of the vehicular mechanism 12 is balanced, the various design parameters of each component 14 are changed. As each of the individual components 14 change, the relationships between each of the components 14 also changes, which may require additional and/or subsequent balancing. By way of explanation, and not limitation, a four-bar linkage, such as the one described above, can be generally classified according to the Grashof criterion, which describes four-bar mechanisms by the mathematical equation: $S+L \leq p+q$, where S, L, p and q represent the links of the shortest, longest, and two intermediate links, respectively. As the links of the various components 14 of the vehicular mechanism 12 change, the identification of each of the components 14 as being either the shortest, longest, or intermediate link may also change, where an intermediate link may become the shortest or longest link, for example. In other words, the underlying mathematics may drive the solution space to change as a result of the analysis itself. As the solution space (the four-bar linkage, for example) changes, the method described above analytically determines the limits of feasibility for each component 14 and the vehicular mechanism 12 as a whole. Mathematically speaking, the various embodiments of the method for out-of-specification robustness analysis described above determine the domain of the function for each case. The domain of each solution space is then compared to the specification limits of the vehicular mechanism 12. This can be described mathematically as the domain $D=\{(S, L, p, q):p+q-S-L \geq 0\}$. Where the vehicular mechanism 12 includes additional components 14, beyond a four-bar linkage, the mathematics involved, while similar, can be more complex.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for increasing the robustness of a vehicular mechanism, the method comprising the steps of:
   determining at least one primary function of a vehicular mechanism;
   identifying functional components of the vehicular mechanism used during the respective at least one primary function;
   analyzing each functional component during performance of each at least one primary function under in-specification conditions;
   analyzing each functional component during performance of each at least one primary function under decreasing out-of-specification conditions to determine a lower failure value for each functional component;
   analyzing each functional component during performance of each at least one primary function under increasing out-of-specification conditions to determine an upper failure value for each functional component;
   determining a modified robustness value for each functional component, wherein the modified robustness value is between the lower and upper failure values; and
   modifying at least one functional component in the vehicular mechanism wherein each functional component of the vehicular mechanism has a robustness that is approximately the modified robustness value of the respective functional component.

2. The method of claim 1, wherein the step of analyzing each functional component during performance of each at least one primary function under in-specification conditions, includes analyzing each component under minimum in-specification conditions and maximum in-specification conditions.

3. The method of claim 1, wherein the step of modifying each functional component includes changing at least one dimension of the functional component.

4. The method of claim 1, wherein the step of modifying each functional component includes changing at least one material of the functional component.

5. The method of claim 1, wherein the in-specification conditions include a functional component that has component parameters that are within designed parameters of the functional component, and wherein the out-of-specification conditions include a functional component that has at least one component parameter that is outside of the designed parameters of the functional component.

6. The method of claim 5, wherein the increasing and decreasing out-of-specification conditions include the functional component having at least one dimension that is above or below, respectively, the designed parameters.

7. The method of claim 5, wherein the increasing and decreasing out-of-specification conditions include the functional component having at least one component parameter that is above or below, respectively, the designed parameters.

8. The method of claim 1, further comprising the step of:
   balancing the robustness of each functional component within the vehicular mechanism such that the vehicular mechanism includes a modified overall robustness for the at least one primary function of the vehicular mechanism.

9. The method of claim 1, wherein the vehicular mechanism includes a plurality of primary functions.

10. A method for increasing robustness of a vehicular mechanism, comprising the steps of:
    identifying components of a vehicular mechanism used during performance of a primary function of the vehicular mechanism;
    analyzing the components under in-specification and out-of-specification conditions to determine at least one failure value and a modified robustness value; and
    modifying each component to include robustness that is approximately the modified robustness value, being proximate the component's at least one failure value.

11. The method of claim 10, wherein the in-specification conditions include a component having component parameters that are within the designed parameters of the component.

12. The method of claim 11, wherein the out-of-specification conditions include increasing and decreasing out-of-specification conditions, wherein the component has at least one dimension that is above or below, respectively, the designed parameters.

13. The method of claim 11, wherein the out-of-specification conditions include increasing and decreasing out-of-specification conditions, wherein the component has at least one component parameter that is above or below, respectively, the designed parameters.

14. The method of claim 10, further comprising the step of:
    analyzing each component under minimum in-specification conditions and maximum in-specification conditions.

15. The method of claim 10, wherein the step of modifying each component includes at least one of changing one or more dimensions of the component and changing one or more materials of the component.

16. The method of claim 10, further comprising the step of:
    balancing the robustness of each component within the vehicular mechanism such that the vehicular mechanism includes modified overall robustness for at least one of the primary functions of the vehicular mechanism.

17. The method of claim 10, wherein the vehicular mechanism includes a plurality of primary functions.

18. The method of claim 10, further comprising the step of:
    balancing the robustness of each component within the vehicular mechanism such that the vehicular mechanism includes a second overall robustness for at least one of the primary functions of the vehicular mechanism, wherein the second overall robustness is different than the first overall robustness.

19. The method of claim 10, wherein the step of modifying each component includes at least one of changing one or more dimensions of the component and changing one or more materials of the component.

20. A method for increasing the robustness of a vehicular mechanism, the method comprising the steps of:
    selecting a vehicular mechanism having a first overall robustness;
    determining primary functions of a vehicular mechanism;

identifying components of the vehicular mechanism used during at least one of the primary functions, wherein each component has a base robustness value;

analyzing each component during performance of each at least one primary function under in-specification conditions, including minimum in-specification conditions and maximum in-specification conditions;

analyzing each component during performance of each at least one primary function under decreasing out-of-specification conditions to determine a lower failure value for each component;

analyzing each component during performance of each at least one primary function under increasing out-of-specification conditions to determine an upper failure value for each component;

determining a modified robustness value for each component, wherein the modified robustness value is between the lower and upper failure values; and modifying at least one component in the vehicular mechanism, wherein each component of the vehicular mechanism has a robustness changed from the base robustness value to approximately the component's respective modified robustness value.

* * * * *